350-6.5 SR

OR 3,752,558

[11] 3,752,558
[45] Aug. 14, 1973

Lloyd

I 3024IV

[54] DOCUMENT

[75] Inventor: Lester John Lloyd, Orinda, Calif.
[73] Assignee: Decision Consultants, Oakland, Calif.

[22] Filed: June 28, 1971
[21] Appl. No.: 157,348
[52] U.S. Cl. .......... 350/6, 355/41, 178/7.6, 95/4.5, 350/285
[51] Int. Cl. .......... G02b 17/00
[58] Field of Search .......... 355/41; 350/6, 7, 350/285; 178/7.6; 250/234, 235, 236; 95/4.5

[56] References Cited

UNITED STATES PATENTS 3,346,739 10/1967 Jenker .......... 250/219
...de .......... 350/6 UX
...cMillin .......... 355/41 X

*Primary Examiner*—Ronald L. Wibert
*Assistant Examiner*—Michael J. Tokar
*Attorney*—Limbach, Limbach & Sutton

[57] ABSTRACT

A 90° reflector scans a flat document to reflect an image of part of the document into a plane parallel to the document. Then a 180° reflector reflects the image back toward a detection station. A transport made of a cable and pulleys moves the 180° reflector at one-half the speed of the 90° reflector so that the optical distance between the detection station and the document remains constant throughout the scan.

7 Claims, 8 Drawing Figures

INVENTOR.
LESTER JOHN LLOYD
BY
Limbach, Limbach & Sutton
ATTORNEYS

INVENTOR
LESTER JOHN LLOYD
BY
Limbach, Limbach & Sutton
ATTORNEYS

INVENTOR.
LESTER JOHN LLOYD
BY
Limbach, Limbach & Sutton
ATTORNEYS

INVENTOR
LESTER JOHN LLOYD
BY
Limbach, Limbach & Sutton
ATTORNEYS

DOCUMENT SCANNER

BACKGROUND OF THE INVENTION

Optical scanners are used in a variety of applications for sensing marks or characters on the document or copying the document. The scanner carries an image of the document from a scanning station to a detection station where some detector senses marks, characters or pictorial information in the image. The detection station may include a second orthogonal scanner whereby the primary scanner images successive lines of the doucment and a secondary scanner images the individual characters in the line sequentially on a single detector.

In many sitatuions it is very desirable to provide such a scanner which is as compact as possible. Additionally, it is very desirable to provide such scanners in which the scanning station is flat so that documents can be supported conveniently in a flat condition and so that documents can be conveyed as easily as possible to and from the scanning station.

SUMMARY OF INVENTION

In accordance with this invention there is provided a document scanner in which the document is supported in a flat condition at the scanning station. The scanner provides a folded optical path between the scanning and detection stations so that the device can be as compact as possible with a given optical system.

A unique reflection arrangement is provided to maintain a constant length optical path from scanning station to the detection station so that the image at the detection station remains in sharp focus thorughout scanning of the document. The reflection arrangement can use pivoted and swinging mirrors, but preferably it uses a 90° reflector and a 180° reflector moved parallel to the document being scanned.

In this preferred arrangement the 180° reflector is moved at one-half the speed of the 90° reflector, and a unique and simple pulley and cord arrangement controls transportation of the two reflectors while controlling their relative speeds.

Other features and advantages of the invention will become apparent from the description read in conjunction with the attached drawings of one preferred embodiment of the invention in which.

DETAILED DESCRIPTION

Figures 1, 2:
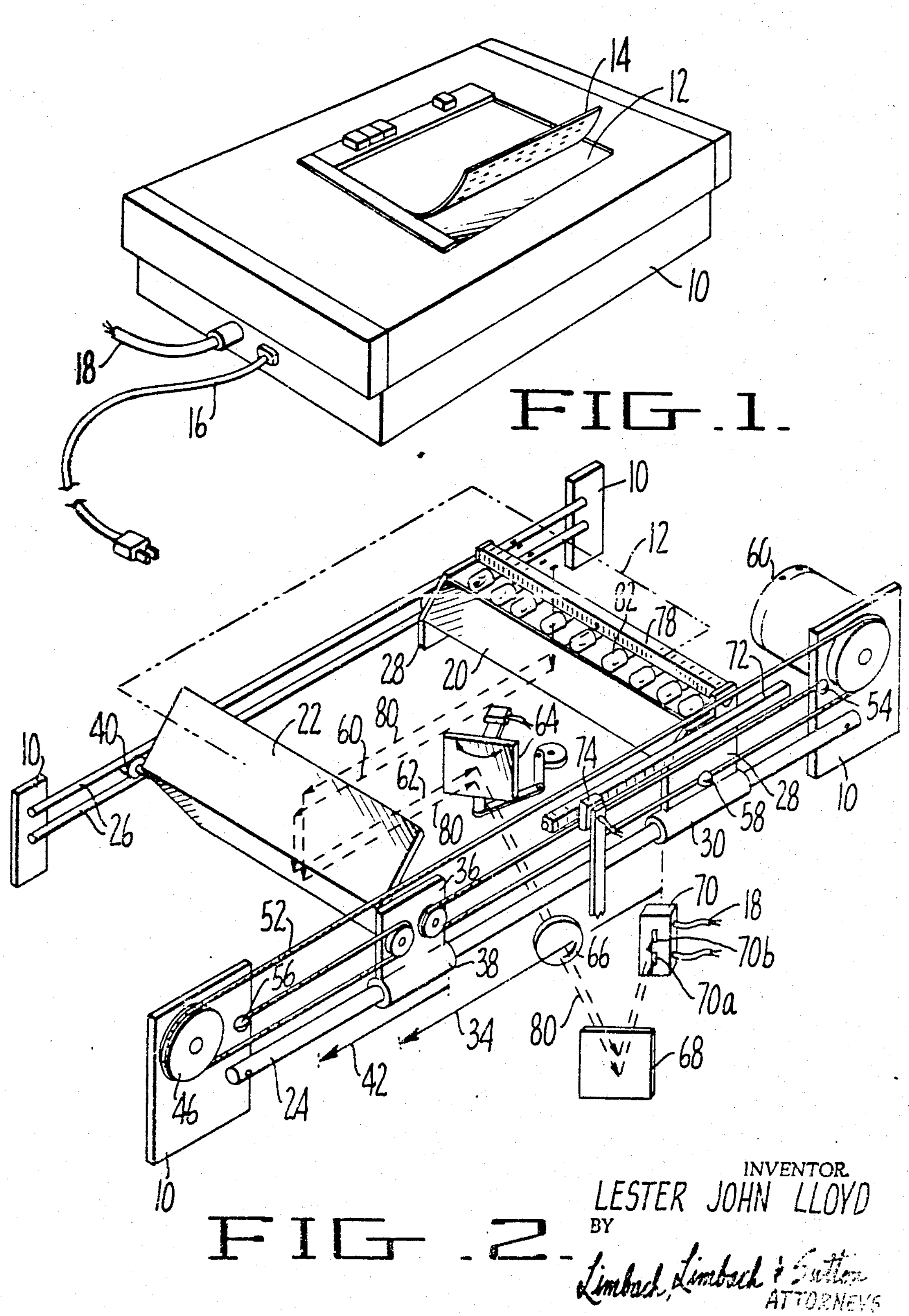
FIG. 1 is a prespective view of a document scanner of this invention.
FIG. 2 is a prespective view of the interior scanning mechanism in the scanner of FIG. 1.

Referring now in detail to the drawings and particularly to FIGS. 1 and 2, the scanner illustrated therein includes a main frame portion 10 having a top window 12 which defines a scanning station where a document 14 may be placed for scanning. Automatic document feed apparatus may be added to the device. An electrical input lead 16 provides power for the scanner, and an output lead 18 conducts electrical signals responsive to the information scanned on the document.

The scanning station 12 is illustrated in phantom outline in FIG. 2 immediately above a 90° reflector 20 and a 180° reflector 22.

A main guide rod 24 is mounted on the frame 10 at one side of the scanner, and a pair of guide rods 26 is mounted on the other side of the frame parallel to the rod 24. The 90° mirror 20 is mounted on a support structure having a pair of end plates 28. One of the end plates 28 carries a sleeve 30 slidably engaging the rod 24, and the other end plate 28 carries a roller 32 which rides between the rods 26 to thereby guide the 90° mirror 20 along a scanning path which is parallel to the document being scanned and indicated by the arrows 34 in FIGS. 2 and 3.

In a similar manner, the 180° reflector 22 is mounted on a pair of end plates 36 which carry a sleeve 38 and roller 40 engaging the rods 24 and 26 respectively to guide the reflector 22 along that path 42 which is parallel to the path 34.

Figure 5:
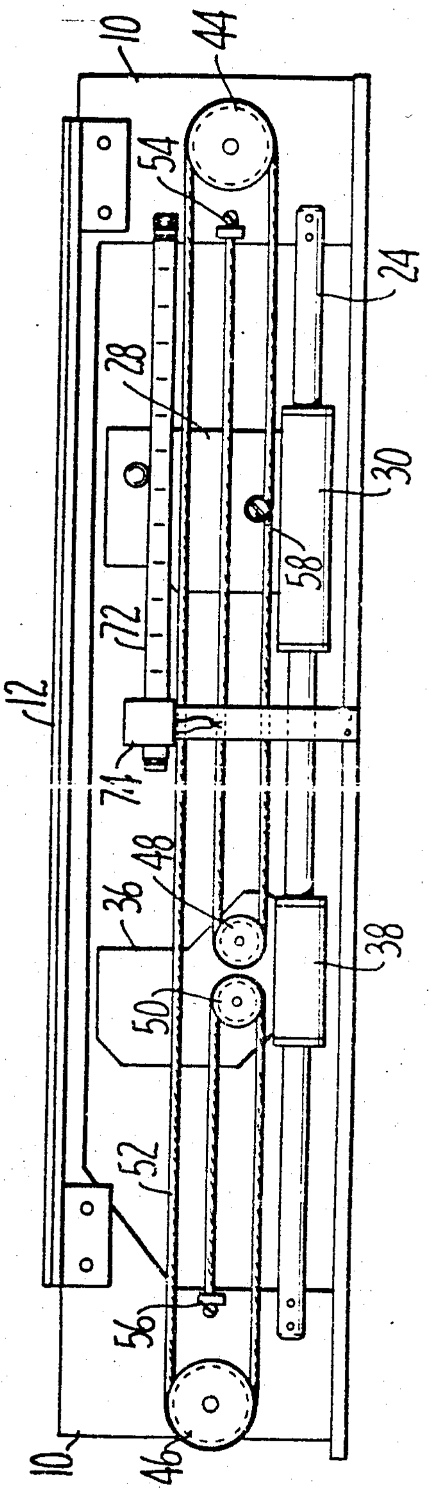
FIG. 5 is a vertical sectional view taken on the plane indicated at 5—5 in FIG. 3.

The reflectors 20 and 22 are transported under the scanning station 12 by a cord and pulley arrangement best illustrated in FIGS. 2 and 5. A pair of fixed pulleys 44 and 46 are rotatably mounted on the frame 10, and a pair of movable pulleys 48 and 50 are rotatably mounted on one of the end plates 36 of the 180° reflector 22. A cord or cable 52 is attached to the frame 10 by attachment screw 54 and extends first over the movable pulley 48 hence over fixed pulley 44 hence over fixed pulley 46 and movable pulley 50 to a tie-down point at screw 56. The cord 52 is attached to the carriage 28 for the 90° mirror 20 by means of a screw 58, and a drive motor 60 is connected to the pulley 44 for driving the pulley to cause scanning of a document. The drive motor may operate in a continuous fashion, but it is preferred that the drive motor be provided with a break and incremental stop start circuitry so that the scanner will scan a line at a time as explained in greater detail hereinafter.

It will be apparent that the cord and pulley arrangement operates to maintain an exact relationship between the travel paths of the two reflectors 20 and 22. Any movement of the 90° reflector 20 along its path 34 is accompanied by exactly one-half the travel of the 180° reflector 22 along its path 42.

Figure 3:
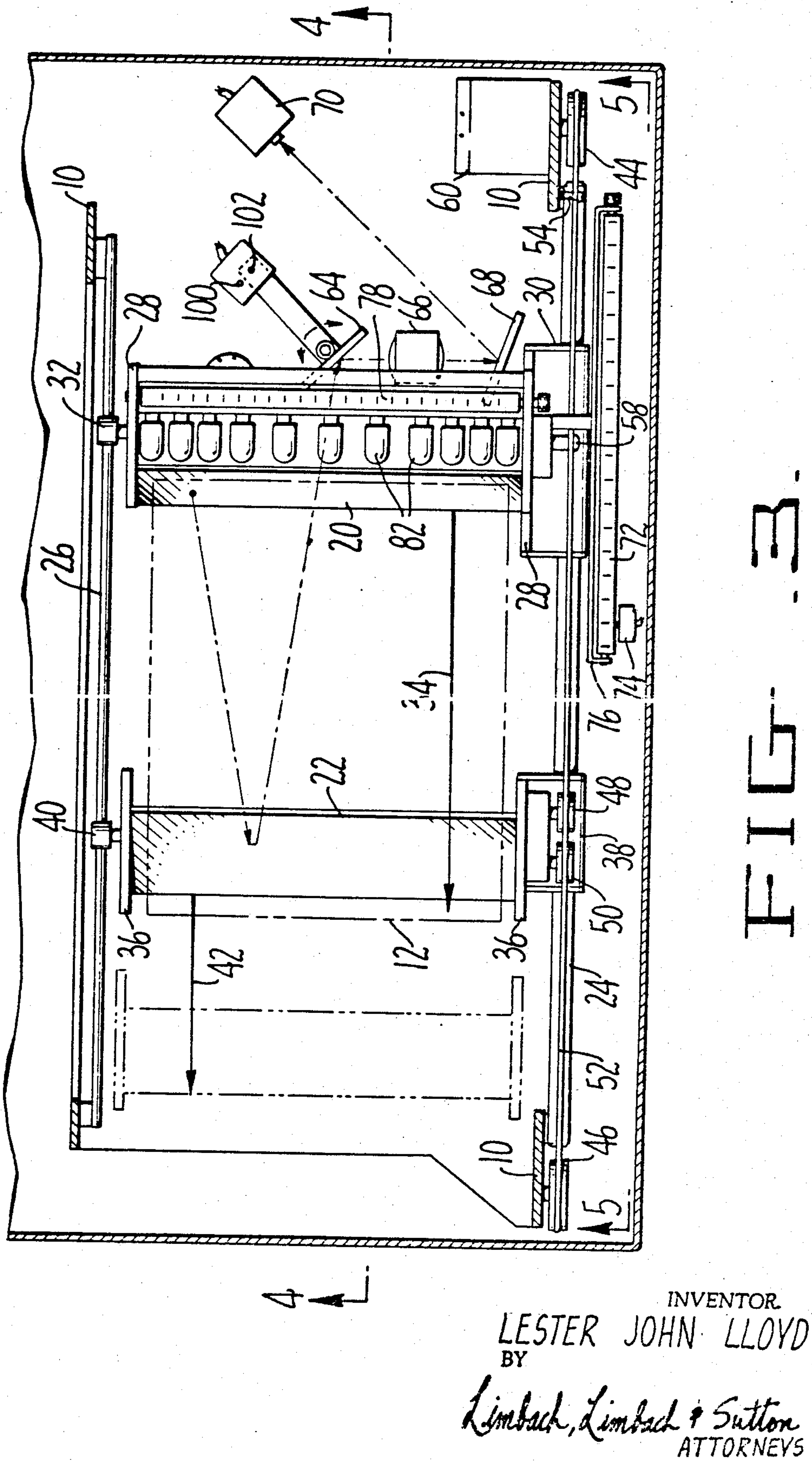
FIG. 3 is a horizontal sectional view of the scanner of FIG. 1 taken on a plane just inside the top panel of the scanner.
Figure 4:
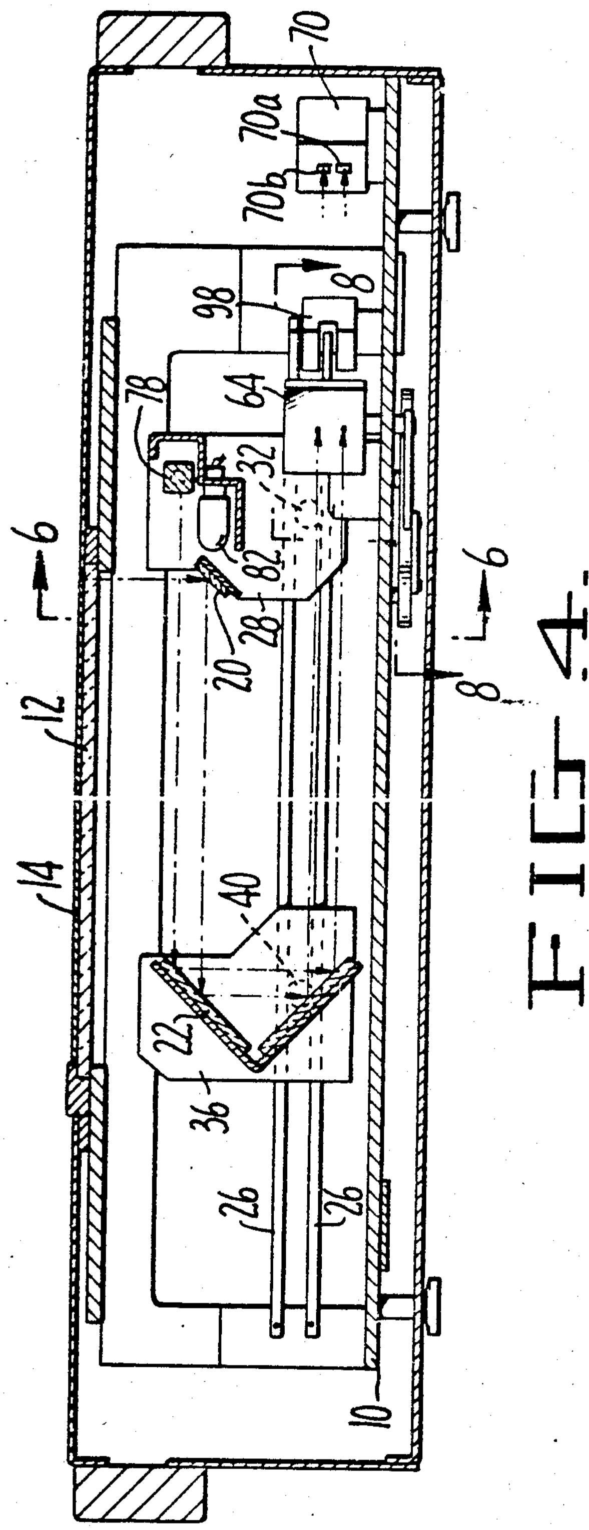
FIG. 4 is a vertical sectional view taken on the plane indicated at 4—4 in FIG. 3.

Referring again to FIG. 2, an image of a document at scanning station 12 is reflected by mirror 20 along a path 60 and hence by mirror 22 back along parallel path 62 to a detection system which includes a scanning mirror 64, a lens 66, a fixed mirror 68 and a photodetector 70. Obviously this detection system could be replaced by a complete line of photodetectors which viewed a full line of the document at one time, but the arrangement illustrated herein is much preferred because it provides complete flexibility for the character positions which can be examined along each line of scanned data. Because of the arrangement for bodily moving both of the scanning mirror 20 and 22 in the way described above, the optical path from a document at scanning station 12 to photodetector 70 remains constant as the mirror 20 moves along path 34 to scan successive lines of the document. An index bar 72 is mounted on the carriage 28 for movement past a detector 74. The index bar 72 carries lines representative of the data line positions on a document at the scanning station, and the output of the detector 74 is provided to suitable electronics for starting and stopping the motor 60 as explained above. For convenient conversion of the scanner for handling documents with different line spacings, the index bar 72 is rotatably mounted in a frame 76 as indicated in FIGS. 3 and 7, and the bar is provided with different index patterns on different faces so that the line spacing for the scanning mechanism may be changed simply by rotating the bar 72.

A similar index bar 78 is mounted on the carriage 28 for displaying index marks representative of the series of character positions along a line being scanned by the scanner. These index marks are viewed along path 80 (FIG. 2) by the lower detector 70A in the photodetector assembly 70 while corresponding character positions on the document at scanning station 12 are viewed by the upper photodetector 70B of the assembly along the optical path 60-62 described above.

A series of light bulbs 82 are provided on the carriage for illuminating the document being scanned and the index bar 78. It will be apparent that the bar 78 is also rotatably mounted with different index patterns on difference faces of the bar to permit the scanner to be adapted rapidly to scanning documents with different character spacing along each scanning line.

Figure 6:
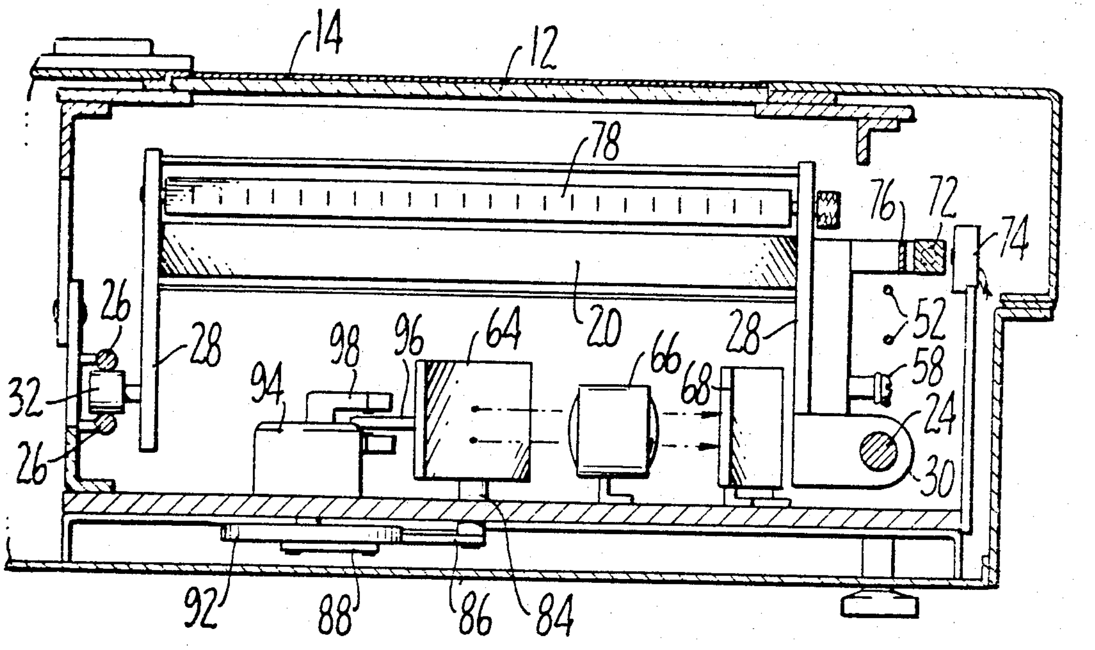
FIG. 6 is a vertical sectional view taken on the plane indicated at 6—6 in FIG. 4.
Figures 7, 8:
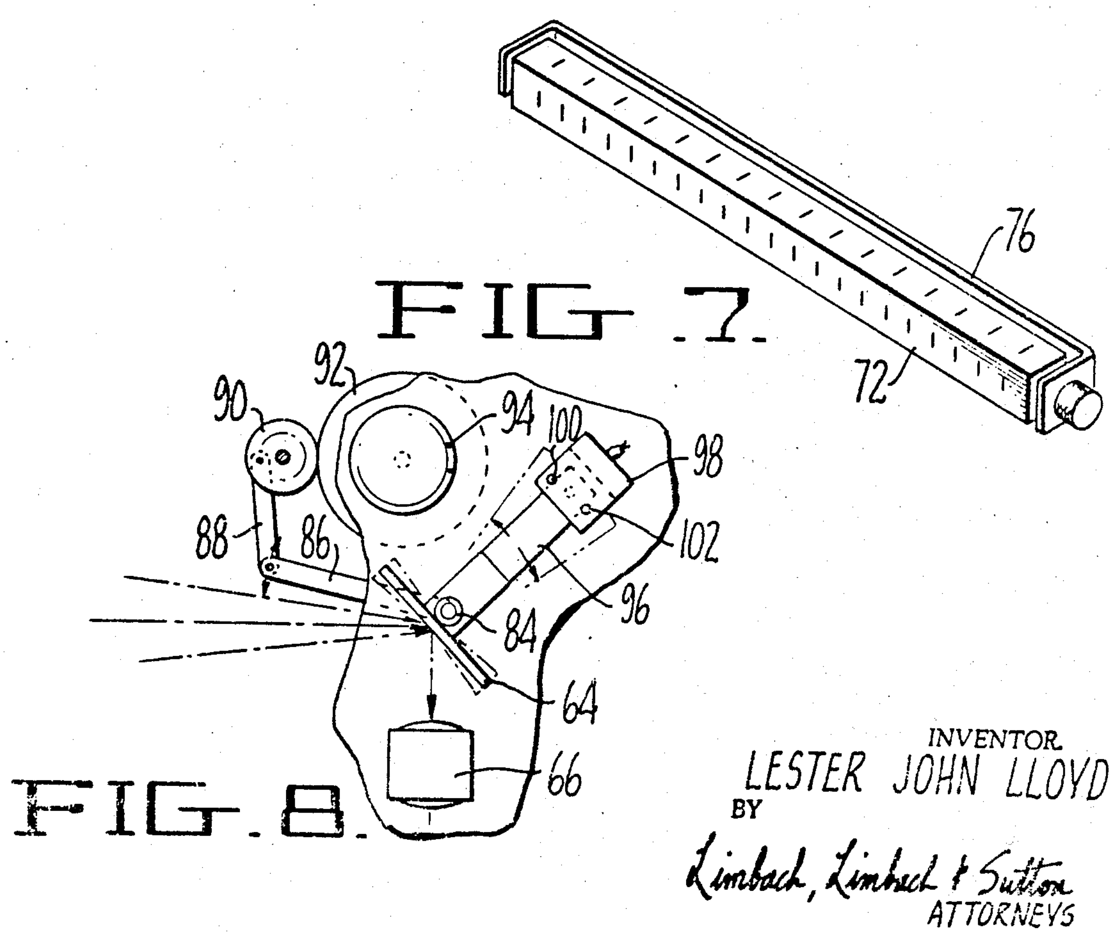
FIG. 7 is a prespective view of one of the calibrating rods used in the scanner of FIGS. 1-6.
FIG. 8 is a horizontal sectional view taken upon the broken plane indicated at 8-8 in FIG. 4.

The mechanism for oscillating the pivoting line scanning mirror 64 is best illustrated in FIGS. 6 and 8. The mirror 64 is pivotally mounted on the frame at a pivot post 84 and is driven by a crank arm 86. The crank arm 86 is in turn driven by a link 88 attached to a drive wheel 90 which is in turn driven by a wheel 92 on the motor 94. An arm 96 is mounted on the back of the mirror 64 and extends into a yoke 98 containing a pair of photodetectors 100 and 102, the outputs of which indicate to the machine electronics when the scanner is starting and completing a line scan.

While one embodiment of the invention has been illustrated and described in detail herein it is obvious that many modifications thereof may be made without departing from the spirit and scope of the invention.

What is claimed is:

1. In a document scanning apparatus having a scanning station adapted to hold a document in substantially flat condition and a detector station for detecting an image of at least a small portion of the document, the improved scanner for moving an image of a document at said scanning station across said detection station along an optical path of constant length with comprises:

- a 90° reflector positioned across said scanning station in a manner to reflect an image of a line substantially completely across said document along a first plane generally parallel to said scanning station,
- a 180° reflector for reflecting said line image from said 90° reflector back toward said detection station in a second plane generally parallel to said first plane, and
- transport means for moving said 90° and 180° reflectors generally parallel to said scanning station simultaneously at different speeds whereby the distance from said scanning station past said 90° reflector past said 180° reflector to said detection station remains substantially constant as said 90° reflector traverses said scanning station.

2. The apparatus of claim 1 characterized further in that said transport means comprises means for moving said 180° mirror in the same direction as and at one-half the speed of said 90° mirror.

3. In a document scanning apparatus having a scanning station adapted to provide an optical object in substantially flat condition, a frame mounted in fixed position with respect to said scanning station, and a detector station for detecting an image of at least a small portion of the object, the improved scanner for moving an image of an object at said scanning station across said detection station along an optical path of constant length which comprises:

- a 90° reflector for reflecting an image of a portion of said object along a first plane generally parallel to said scanning station,
- a 180° reflector for reflecting said image from said first reflector back toward said detection station in a second plane generally parallel to said first plane, and
- transport means for moving said 90° and 180° reflectors generally parallel to said scanning station simul-taneously at different speeds whereby the distance from said scanning station past said 90° reflector past said 180° reflector to said detection station remains substantially constant as said 90° reflector traverses said scanning station, said transport means comprises:
- first and second fixed pulleys on said frame,
- first and second movable pulleys on said 180° reflector,
- a cord extending from said frame over said first movable pulley hence over said first fixed pulley hence over said second fixed pulley and hence over said second movalbe pulley to said frame,
- means attaching said 90° reflector to said cord, and
- drive means for rotating one of said pulleys.

4. In a document scanning apparatus having a scanning station adapted to provide an optical object in substatnially flat condition and a detector station for detecting an image of at least a small portion of the object, the improved scanner for moving an image of an object at said scanning station across said detection station along an optical path of constant length which comprises:

- a 90° reflector for reflecting an image of a portion of said object along a first plane generally parallel to said scanning station,
- a 180° reflector for reflecting said image from said first reflector back toward said detection station in a second plane generally parallel to said first plane,
- transport means for moving said 90° and 180° reflectors generally parallel to said scanning station simultane-ously at different speeds whereby the distance from said scanning station past said 90° reflector past said 180° reflector to said detection station remains substantially constant as said 90° reflector traverses said scanning station, and
- an oscillating reflector mounted between said 180° reflector and said detection station for pivotal movement about an axis perpendicular to said planes, whereby said detection station scans along the lines of a sequence of lines of a document at said scanning station.

5. A document scanner, comprising:

a frame, a scanning station attached to said frame and for holding a two-dimensional document in a substantially flat condition, a flat first reflector held by said frame to one dimension of a document held by the scanning station and movable with respect to said frame along a second dimension of a document, said first reflector being held at an angle with respect to the document scanning station to reflect one at a time each document line along a first given plane in space as the first reflector is moved along said seccond document direction, a second reflector held by said frame to extend across said scanning station in the path of said first plane in a manner to be movable with respect to said frame along the second document direction, thereby to reflect document line images of said first given plane into a second given plane in space, an oscillating mirror mounted on said frame for pivotal movement about an axis perpendicular to said second plane, said mirror being positioned in the second plane for scanning document line images therein across a first point fixed in space with respect to said frame, a first photodetector positioned at said first point in space, and means for moving said first and second reflectors simultaneously along said frame at different speeds in a manner to maintain a distance from the scanning station to the photo-detector substantially constant as said first reflector traverses said scanning station in the second document direction.

6. The document scanner of claim 5 which additionally comprises:

an index bar mounted across the scanning station to move with said first reflector, said index bar being positioned with respect to the first reflector so that an image thereof is scanned by the second reflector and oscillating mirror across a second point fixed in space with respect to said frame, and a second photodetector positioned at said first point in space, whereby index marks on said index bar are detected by the second photodetector to provide information of a document line image position being detected by said first photodetector.

7. The document scanner of claim 6, wherein said index bar includes a plurality of index markings having different periods on various sides thereof, the index marking to be imaged onto the second photodetector being selectable by manual rotation of the index bar, whereby the period of index markings appropriate to a given document format to be scanned can be selected.

* * * * *

UNITED STATES PATENT OFFICE

CERTIFICATE OF CORRECTION

Patent No. 3,752,558 Dated August 14, 1973

Inventor(s) Lester John Lloyd

It is certified that error appears in the above-identified patent and that said Letters Patent are hereby corrected as shown below:

Column 5, line 5, "to" should read -- across --.
Column 6, line 15, "first" should read -- second --.

Signed and sealed this 8th day of January 1974.

(SEAL)
Attest:

EDWARD M.FLETCHER,JR.
Attesting Officer

RENE D. TEGTMEYER
Acting Commissioner of Patents